US011887472B2

(12) United States Patent
Guo et al.

(10) Patent No.: US 11,887,472 B2
(45) Date of Patent: Jan. 30, 2024

(54) METHOD AND SYSTEM FOR EVALUATING ROAD SAFETY BASED ON MULTI-DIMENSIONAL INFLUENCING FACTORS

(71) Applicant: SOUTHEAST UNIVERSITY, Nanjing (CN)

(72) Inventors: Yanyong Guo, Nanjing (CN); Hongliang Ding, Nanjing (CN); Yao Wu, Nanjing (CN); Pan Liu, Nanjing (CN); Pei Liu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/925,748

(22) PCT Filed: Jul. 4, 2022

(86) PCT No.: PCT/CN2022/103535
§ 371 (c)(1),
(2) Date: Nov. 16, 2022

(87) PCT Pub. No.: WO2023/098076
PCT Pub. Date: Jun. 8, 2023

(65) Prior Publication Data
US 2023/0215270 A1 Jul. 6, 2023

(30) Foreign Application Priority Data
Dec. 3, 2021 (CN) ......................... 202111465931.5

(51) Int. Cl.
*G08G 1/01* (2006.01)

(52) U.S. Cl.
CPC ......... *G08G 1/0129* (2013.01); *G08G 1/0137* (2013.01)

(58) Field of Classification Search
CPC ........................... G08G 1/0129; G08G 1/0137
(Continued)

(56) References Cited

U.S. PATENT DOCUMENTS 10,490,078 B1 * 11/2019 Fields .............. G08G 1/096838
2008/0071465 A1 * 3/2008 Chapman ........... G01C 21/3691
701/117
(Continued)

FOREIGN PATENT DOCUMENTS

AU 2021104800 A4 9/2021
CA 2245185 A1 * 2/2000 ........... G08G 1/0104
(Continued)

OTHER PUBLICATIONS

Wang Xuesong et al., Macro Level Safety Modeling and Impact Factor Analysis, Nov. 15, 2012, pp. 1627-1633, vol. 40, Issue 11, Journal of Tongji University(Natural Science).
(Continued)

*Primary Examiner* — Atul Trivedi
(74) *Attorney, Agent, or Firm* — MUNCY, GEISSLER, OLDS & LOWE, P.C.

(57) ABSTRACT

The present invention discloses a method and system for evaluating road safety based on multi-dimensional influencing factors, and relates to the field of road safety technologies. Based on historical traffic data and corresponding safety influencing factors, safety evaluation models in different dimensions are respectively constructed, and road safety risk exposure is classified flexibly. The safety evaluation models in macro and micro dimensions are linked by using a constraint function, and influence mechanisms of the safety influencing factors are determined respectively. Specifically, a safety evaluation model is constructed and obtained for each sub-region in a limited region range. The safety evaluation model is applied to obtain influencing
(Continued)

factors of safety of each traffic road in the sub-region, and safety evaluation is performed on the sub-region. Through the technical solutions of the present invention, an accurate, comprehensive, objective method for evaluating road safety that reflects authentic influence data is provided, which has a wider application scope.

7 Claims, 1 Drawing Sheet

(58) Field of Classification Search
USPC .......................................................... 701/117
See application file for complete search history.

(56) References Cited

U.S. PATENT DOCUMENTS

| | | | | |
|---|---|---|---|---|
| 2014/0074402 | A1 | 3/2014 | Hassib et al. | |
| 2016/0027300 | A1* | 1/2016 | Raamot | G08G 1/0145 340/922 |
| 2016/0061625 | A1* | 3/2016 | Wang | G01C 21/3697 701/454 |
| 2016/0086285 | A1* | 3/2016 | Jordan Peters | G08G 1/096827 701/484 |
| 2016/0167652 | A1* | 6/2016 | Slusar | G01C 21/3461 701/27 |
| 2017/0116485 | A1* | 4/2017 | Mullen | G08G 1/096716 |
| 2017/0234689 | A1* | 8/2017 | Gibson | B60W 60/0053 701/25 |
| 2021/0172750 | A1 | 6/2021 | De Nunzio et al. | |
| 2021/0233395 | A1* | 7/2021 | Rocha | G08G 1/052 |
| 2022/0258739 | A1* | 8/2022 | Monteuuis | B60W 50/10 |
| 2023/0033672 | A1* | 2/2023 | Nayak | G08G 1/0175 |
| 2023/0093601 | A1* | 3/2023 | Pendleton | G06V 20/58 701/23 |
| 2023/0204378 | A1* | 6/2023 | Fowe | G08G 1/005 701/450 |
| 2023/0245564 | A1* | 8/2023 | James | G08G 1/0116 701/117 |

FOREIGN PATENT DOCUMENTS

| | | | | | |
|---|---|---|---|---|---|
| CA | 2853920 | A1 | * | 12/2014 | G06Q 40/08 |
| CN | 106530706 | A | | 3/2017 | |
| CN | 107909247 | A | | 4/2018 | |
| CN | 108428340 | A | | 8/2018 | |
| CN | 109118773 | A | | 1/2019 | |
| CN | 109118773 | A | * | 1/2019 | G06Q 10/0635 |
| CN | 109448369 | A | | 3/2019 | |
| CN | 109598929 | A | | 4/2019 | |
| CN | 109714421 | A | | 5/2019 | |
| CN | 111738474 | A | | 10/2020 | |
| CN | 112037513 | A | | 12/2020 | |
| CN | 112100857 | A | * | 12/2020 | G06F 17/18 |
| CN | 112447048 | A | | 3/2021 | |
| CN | 112950946 | A | | 6/2021 | |
| CN | 113313357 | A | | 8/2021 | |
| CN | 113487863 | A | | 10/2021 | |
| CN | 114241753 | A | | 3/2022 | |
| CN | 114241753 | B | * | 11/2022 | G08G 1/0129 |
| WO | WO2016122881 | A1 | | 8/2016 | |
| WO | WO-2019036642 | A1 | * | 2/2019 | G06Q 10/06393 |
| WO | WO-2021096935 | A2 | * | 5/2021 | B60W 40/04 |
| WO | WO2021208327 | A1 | | 10/2021 | |

OTHER PUBLICATIONS

Yang Shaowei et al., Review of Operation Analysis Methods of Expressway Weaving Area, Oct. 15, 2018, 13 pages, vol. 35, Issue 10, Journal of Highway and Transportation Research and Development.

Niu Jianfeng et al., Discussion on Key Technology of Traffic Safety Situation Assessment in Regional Highway Network, Sep. 30, 2009, 5 pages, Shanghai Highways.

Liao Jun et al., Synthesized evaluation model of dynamic traffic safety for road section, Aug. 15, 2009, 6 pages, Journal of Traffic and Transportation Engineering.

* cited by examiner

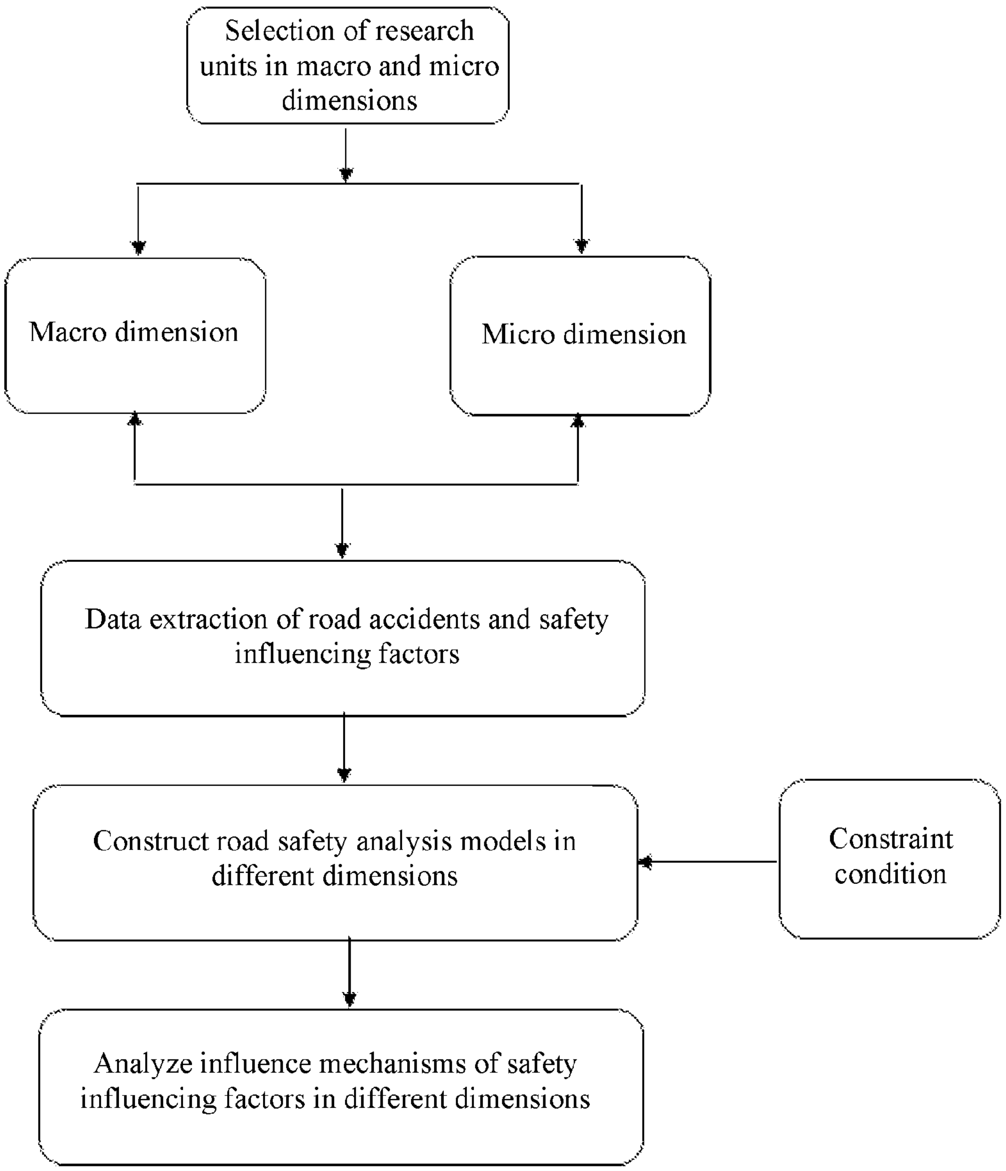
Selection of research units in macro and micro dimensions
Macro dimension
Micro dimension
Data extraction of road accidents and safety influencing factors
Construct road safety analysis models in different dimensions
Constraint condition
Analyze influence mechanisms of safety influencing factors in different dimensions

METHOD AND SYSTEM FOR EVALUATING ROAD SAFETY BASED ON MULTI-DIMENSIONAL INFLUENCING FACTORS

TECHNICAL FIELD

The present invention relates to the field of road safety technologies, and in particular, to a method and system for evaluating road safety based on multi-dimensional influencing factors.

BACKGROUND

With the development of social economy, the car ownership is gradually increased, which not only causes the road congestion, but also gradually increases the incidence of road traffic accidents. To reduce the incidence of road accidents and improve road safety, a variety of road safety analysis models are provided in the related research fields. There are two levels of road safety analysis models, where one is a road safety analysis model at the macro level, and the other is a road safety analysis model at the micro level. However, whether in the research field or the patent field, no relevant research comprehensively considers the correlation between the road safety analysis models at the macro level and the micro level. To establish a road safety analysis model only from the perspective of one dimension causes some deviation to analysis results. In addition, motor vehicle annual average daily traffic is considered as effective safety risk exposure, which is of great significance for measuring influencing factors and accident generation mechanisms. However, relevant literatures all assume that influence of the safety risk exposure is constant. Essentially, the influence should be elastic. With the change of the motor vehicle annual average daily traffic, the influencing factors have similarities and differences.

SUMMARY

The objective of the present invention is to provide a method and system for evaluating road safety based on multi-dimensional influencing factors, to resolve the problems in the related art.

To achieve the foregoing objective, the present invention provides the following technical solutions:

A first aspect of the present invention provides a method for evaluating road safety based on multi-dimensional influencing factors, including: respectively constructing, for each sub-region in a limited region range, a safety evaluation model through step A to step D, and obtaining, by using the safety evaluation model through step E to step F, influencing factors of safety of each traffic road in the sub-region and performing safety evaluation on the sub-region:

step A: periodically obtaining, for the sub-region, historical traffic data of the sub-region within a preset duration and historical traffic data of each traffic road in the sub-region within the preset duration, and entering step B;

step B: using motor vehicle daily traffic as safety risk exposure, obtaining safety risk exposure corresponding to the sub-region and safety risk exposure corresponding to each traffic road of the sub-region based on the historical traffic data of the sub-region within the preset duration and the historical traffic data of each traffic road in the sub-region within the preset duration, quantifying each safety risk exposure to obtain each categorical variable T corresponding to each safety risk exposure, and entering step C;

step C: constructing, for each traffic road included in the sub-region, a road safety quantification sub-model based on the corresponding historical traffic data and the corresponding categorical variable T obtained in step B, to obtain road safety quantification sub-models respectively corresponding to the traffic roads in the sub-region; and constructing, based on the road safety quantification sub-models respectively corresponding to the traffic roads in the sub-region and the historical traffic data of the sub-region, a region safety quantification sub-model corresponding to the sub-region, and entering step D;

step D: using, for each sub-region, a model group formed by a region safety quantification sub-model corresponding to the sub-region and road safety quantification sub-models respectively corresponding to traffic roads in the sub-region as a safety evaluation model corresponding to the sub-region, where an input by each sub-model in the model group is historical traffic data corresponding to the sub-model;

step E: obtaining, according to the method in step A to step C, a region safety quantification sub-model corresponding to the sub-region and each road safety quantification sub-model based on actual traffic data of the sub-region and actual traffic data of each traffic road in the sub-region, and entering step F; and step F: solving, for the sub-region by using the safety evaluation model according to the method in step D, the region safety quantification sub-model corresponding to the sub-region and the road safety quantification sub-models by using a constraint function as a target, to obtain influencing factors of road safety of the sub-region, and performing safety evaluation on the sub-region and each traffic road in the sub-region according to the influencing factors.

Further, the method includes: periodically obtaining historical traffic data of each sub-region in the limited region range within the preset duration, where the historical traffic data corresponding to each sub-region includes: population density N of the sub-region, GDP of the sub-region, road network density K of the sub-region, motor vehicle annual average daily traffic AADT1 of the sub-region, a green area ratio L1 of the sub-region, a residential area ratio L2 of the sub-region, a non-residential area ratio L3 of the sub-region, a road area ratio L4 of the sub-region, and an average driving speed V of the sub-region; and historical traffic data corresponding to each traffic road in each sub-region includes: a traffic road length D, a traffic road lane quantity J, a traffic road width W, whether the traffic road is provided with an accommodation lane Q, motor vehicle annual average daily traffic AADT2 of the traffic road, A, intersection density A of the traffic road, and a traffic road grade D.

Further, the foregoing step B includes: based on the historical traffic data of the sub-region within the preset duration and the historical traffic data of each traffic road in the sub-region within the preset duration, obtaining, for each traffic road corresponding to the sub-region according to the following formula:

$$T = \begin{cases} 1, & AADT_i > AADT_i' \\ 0, & AADT_i < AADT_i' \end{cases}$$

the categorical variables T respectively corresponding to the safety risk exposure of the sub-region and the traffic roads, where $AADT_i$ is AADT1 or AADT2; when $AADT_i$=AADT1, $AADT_i'$ is a median value of motor vehicle annual average daily traffic of all the sub-regions in the limited region range; and when $AADT_i$=AADT2, $AADT_i'$ is a median value of motor vehicle annual average daily traffic of all the traffic roads in the sub-region.

Further, the foregoing step C includes: obtaining, for each traffic road included in the sub-region according to the following formula:

$$lnE2n=\theta_1 T+\theta_2 J_n+\theta_3 W_n+\theta_4 Q_n+\theta_5^{T=0}T_n+\theta_5^{T=1}T_n+\theta_5^{T=0}AADT2_n+\theta_5^{T=1}AADT2_n+\theta_6 A_n+\theta_7 D_n+\varepsilon_n$$

the road safety quantification sub-model $\ln E2_n$ corresponding to each traffic road, where E2 is an accident occurrence amount of the traffic road in a preset time period; $\varepsilon_n$ is an error term of the road safety quantification sub-model; n ranges from 1 to N; N is a total quantity of traffic roads included in each sub-region; $AADT2_n$, $J_n$, $W_n$, $Q_n$, $T_n$, $A_n$, $D_n$ respectively represent motor vehicle annual average daily traffic, a traffic road lane quantity, a traffic road width, whether the traffic road is provided with an accommodation lane, the categorical variable corresponding to the safety risk exposure of the traffic road, intersection density of the traffic road, and a traffic road grade of an $n^{th}$ traffic road included in the sub-region; $\theta_1$, $\theta_2$, $\theta_3$, $\theta_4$, $\theta_6$, $\theta_7$ respectively correspond to the categorical variable corresponding to the safety risk exposure of the sub-region, and the traffic road lane quantity, the traffic road width, whether the traffic road is provided with an accommodation lane, the intersection density of the traffic road, and a safety influence coefficient of the traffic road grade of the $n^{th}$ traffic road included in the sub-region; $\theta_5^{T=1}$ represents a safety influence coefficient in a case of the categorical variable T=1 corresponding to the safety risk exposure of the $n^{th}$ traffic road included in the sub-region; and $\theta_5^{T=0}$ represents a safety influence coefficient in a case of the categorical variable T=0 corresponding to the safety risk exposure of the $n^{th}$ traffic road included in the sub-region; and when the traffic road is provided with an accommodation lane, $Q_n$=1; when the traffic road is not provided with an accommodation lane, $Q_n$=0; when the road grade is a main road, $D_n$=1; when the road grade is a secondary road, $D_n$=2; and when the road grade is a branch road, $D_n$=3, where $\theta_5^{T=0}+\theta_5^{T=0}*\ln AADT_i'=\theta_5^{T=1}+\theta 5^{T=1}*\ln AADT_i'$, and in this case, $AADT_i'$ is the median value of motor vehicle annual average daily traffic of all the traffic roads in the sub-region; and obtaining, for each sub-region in the limited region range according to the following formula:

$$lnE1_m=\beta_1 N_m+\beta_2 GDP_m+\beta_3 K_m+\beta_4^{T=0}T_m+\beta_4^{T=1}T_m+\beta_4^{T=0}AADT1_m+\beta_4^{T=1}AADT1_m+\beta_5 L1_m+\beta_6 L2_m+\beta_7 L3_m+\beta_8 L4L_m+\beta_9 V_m+\varepsilon_m$$

a region safety quantification sub-model $\ln E1_m$ corresponding to each sub-region in the limited region range, where E1 is an accident occurrence amount of the sub-region in a preset time period; $\varepsilon_m$ is an error term of the region safety quantification sub-model; m ranges from 1 to M; M is a total quantity of sub-regions included in the limited region range; $N_m$, $GDP_m$, $K_m$, $T_m$, $AADT1_m$, $V_m$, $L1_m$, $L2_m$, $L3_m$, $L4_m$ respectively represent population density, GDP, road network density, the categorical variable corresponding to the safety risk exposure of the sub-region, motor vehicle annual average daily traffic, an average driving speed, a green area ratio, a residential area ratio, a non-residential area ratio, and a road area ratio of an $m^{th}$ sub-region in the limited region range; $\beta_1$, $\beta_2$, $\beta_3$, $\beta_4$, $\beta_5$, $\beta_6$, $\beta_7$, $\beta_8$, $\beta_9$ respectively represent safety influence coefficients of the population density, the GDP, the road network density, the green area ratio, the residential area ratio, the non-residential area ratio, the road area ratio, and the average driving speed of the $m^{th}$ sub-region in the limited region range; $\beta_4^{T=0}$ represents a safety influence coefficient in a case of the categorical variable T=0 corresponding to the safety risk exposure of the $m^{th}$ sub-region in the limited region range; and $\beta_4^{T=1}$ represents a safety influence coefficient in a case of the categorical variable T=1 corresponding to the safety risk exposure of the $m^{th}$ sub-region in the limited region range, where $\beta_4^{T=0}+\beta_4^{T=0}*\ln AADT_i'=\beta_4^{T=1}+\beta_4^{T=1}*\ln AADT_i'$, and in this case, $AADT_i'$ is the median value of motor vehicle annual average daily traffic of all the sub-regions in the limited region range.

Further, the constraint function in the foregoing step F is as follows:

$$\ln E1_m = \sum_{n=1}^{N} \ln E2_n;$$

and the method further includes:

training the safety evaluation model by using the constraint function as the target, and solving, under a constraint condition, safety influence coefficients in the region safety quantification sub-model corresponding to the sub-region and the road safety quantification sub-models, to obtain significance of the safety influence coefficients at a 95% confidence interval, where when the safety influence coefficient is positively significant at the 95% confidence interval, traffic data corresponding to the safety influence coefficients increases incidence of traffic accidents on the traffic road; and when the safety influence coefficient is negatively significant at the 95% confidence interval, the traffic data corresponding to the safety influence coefficient reduces the incidence of traffic accidents on the traffic road.

A second aspect of the present invention provides a system for evaluating road safety based on multi-dimensional influencing factors, including:

one or more processors; and a memory, storing executable instructions, where when the instructions are executed by the one or more processors, the one or more processors perform a process including the method for evaluating road safety according to any one of the foregoing aspect.

A third aspect of the present invention provides a computer-readable storage medium storing software, where the software includes instructions that can be executed by one or more computers, and the instructions, when executed by the one or more computers, perform the operations of the method for evaluating road safety according to any one of the foregoing aspect.

Compared with the related art, the technical solutions adopted in the method and system for evaluating road safety based on multi-dimensional influencing factors provided in the present invention have the following technical effects:

In the present invention, based on the median value of each traffic data, the safety risk exposure corresponding to the sub-region and the safety risk exposure corresponding to each traffic road included in the sub-region are obtained, and the categorical variable corresponding to each safety risk exposure is further obtained. Considering the elastic change of safety risk exposure, a change of motor vehicle annual average daily traffic is affected by various influencing factors, so that an evaluation result of road safety is more objective and more authentic. In addition, a safety quantification model constructed under multi-dimensional conditions based on multi-dimensional consideration, takes into account the correlation of road safety in macro and micro conditions, so that an evaluation result of road safety is more accurate and comprehensive, and the application range of the method is wider.

BRIEF DESCRIPTION OF THE DRAWINGS

The sole FIGURE is a flowchart of a method for evaluating road safety according to an exemplary embodiment of the present invention.

DETAILED DESCRIPTION

To better learn the technical content of the present invention, specific embodiments with reference to the accompanying drawing are used for description below.

Various aspects of the present invention are described in the present invention with reference to the accompanying drawing, which shows a number of illustrative embodiments. The embodiments of the present invention are not limited to those shown in the accompanying drawing. It should be understood that the present invention is realized by any one of the various ideas and embodiments described above and the ideas and implementations described in detail below. This is because the ideas and embodiments disclosed in the present invention are not limited to any implementations. In addition, some of the disclosed aspects of the present invention may be used alone or in any appropriate combination with other disclosed aspects of the present invention.

Referring to the sole FIGURE, the present invention provides a method for evaluating road safety based on multi-dimensional influencing factors, which can accurately determine the influence of various influencing factors on road accidents based on the macroscopic and microscopic road safety analysis models, and includes: respectively constructing, for each sub-region in a limited region range, a safety evaluation model through step A to step D, and obtaining, by using the safety evaluation model through step E to step F, influencing factors of safety of each traffic road in the sub-region and performing safety evaluation on the sub-region.

Research units are selected from the macro and micro dimensions. The research units in the macro dimension are determined as traffic analysis communities, and the research units in the micro dimension are determined as research roads in a traffic analysis community.

Step A: Periodically obtain, for a traffic analysis community, historical traffic data of the traffic analysis community within a preset duration and historical traffic data of each traffic road in the traffic analysis community within the preset duration, where the historical traffic data corresponding to each traffic analysis community includes: population density N of the traffic analysis community, GDP of the traffic analysis community, road network density K of the traffic analysis community, motor vehicle annual average daily traffic AADT1 of the traffic analysis community, a green area ratio L1 of the traffic analysis community, a residential area ratio L2 of the traffic analysis community, a non-residential area ratio L3 of the traffic analysis community, a road area ratio L4 of the traffic analysis community, and an average driving speed V of the traffic analysis community. Historical sample data corresponding to the traffic analysis community is shown in table 1:

TABLE 1

Statistical table of traffic community sample data

| Sample number | E1 | N | GDP | K | L1 | L2 | L3 | L4 | V | AADT |
|---|---|---|---|---|---|---|---|---|---|---|
| $b_1$ | $E1_1$ | $N_1$ | $GDP_1$ | $K_1$ | $L1_1$ | $L2_1$ | $L3_1$ | $L4_1$ | $V_1$ | $AADT_1$ |
| ~ | ~ | ~ | ~ | ~ | ~ | ~ | ~ | ~ | ~ | ~ |
| $b_{10}$ | $E1_{10}$ | $N_{10}$ | $GDP_{10}$ | $K_{10}$ | $L1_{10}$ | $L2_{10}$ | $L3_{10}$ | $L4_{10}$ | $V_{10}$ | $AADT_{10}$ |
| ~ | ~ | ~ | ~ | ~ | ~ | ~ | ~ | ~ | ~ | ~ |
| $b_{200}$ | $E1_{200}$ | $N_{200}$ | $GDP_{200}$ | $K_{200}$ | $L1_{200}$ | $L2_{200}$ | $L3_{200}$ | $L4_{200}$ | $V_{200}$ | $AADT_{200}$ |

Historical traffic data corresponding to each traffic road in the traffic analysis community includes: a traffic road length D, a traffic road lane quantity J, a traffic road width W, whether the traffic road is provided with an accommodation lane Q, motor vehicle annual average daily traffic AADT2 of the traffic road, A, intersection density A of the traffic road, and a traffic road grade D. The historical traffic data of each traffic road included in a single traffic analysis community is shown in table 2:

TABLE 2

Statistical table of sample data of each road

| Sample number | E2 | T | J | W | Q | AADT2 | A | D |
|---|---|---|---|---|---|---|---|---|
| $A_1$ | $E2_1$ | $T_1$ | $J_1$ | $W_1$ | $Q_1$ | $AADT2_1$ | $A_1$ | $D_1$ |
| ~ | ~ | ~ | ~ | ~ | ~ | ~ | ~ | ~ |
| $A_{10}$ | $E2_{10}$ | $T_{10}$ | $J_{10}$ | $W_{10}$ | $Q_{10}$ | $AADT2_{10}$ | $A_{10}$ | $D_{10}$ |
| ~ | ~ | ~ | ~ | ~ | ~ | ~ | ~ | ~ |
| $A_{200}$ | $E2_{200}$ | $T_{200}$ | $J_{200}$ | $W_{200}$ | $Q_{200}$ | $AADT2_{200}$ | $A_{200}$ | $D_{200}$ |

A traffic community b1 is selected as an example of this embodiment of the present invention, and then step B is entered.

Step B: Obtain safety risk exposure corresponding to the sub-region and safety risk exposure corresponding to each traffic road of the sub-region based on the historical traffic data of the sub-region b1 within the preset duration and the historical traffic data of each traffic road in the sub-region within the preset duration; quantify each safety risk exposure to obtain each categorical variable T corresponding to each safety risk exposure; classify the safety risk exposure of the roads based on a median value, where exposure lower than the median value is referred to as low-density motor vehicle daily traffic, and exposure higher than the median value is referred to as high-density motor vehicle daily traffic; assign a categorical variable T to each research unit based on the classified safety risk exposure, where for a research unit with high-density motor vehicle daily traffic, T=1, otherwise T=0; obtain, for each traffic road corresponding to the sub-region according to the following formula:

$$T=\begin{cases}1, & AADT_i > AADT_i' \\ 0, & AADT_i < AADT_i'\end{cases}$$

the categorical variables T respectively corresponding to the safety risk exposure of the sub-region b1 and the traffic roads, where $AADT_i$ is AADT1 or AADT2; when $AADT_i$=AADT1, $AADT_i'$ is a median value of motor vehicle annual average daily traffic of all the sub-regions in the limited region range; and when $AADT_i$=AADT2, $AADT_i'$ is a median value of motor vehicle annual average daily traffic of all the traffic roads in the sub-region; and enter step C.

Step C: Construct, for each traffic road included in the sub-region b1, a road safety quantification sub-model based on the corresponding historical traffic data and the corresponding categorical variable T obtained in step B, to obtain road safety quantification sub-models respectively corresponding to the traffic roads in the sub-region, where three roads A1 to A3 in the sub-region b1 are taken as examples, and road safety quantification sub-models respectively corresponding to the three roads are as follows:

$$lnE2_1=\theta_1 T+\theta_2+\theta_3 W_1+\theta_4 Q_1+\theta_5 \mathrm{AADT2}_1+\theta_6 A_1+\theta_7 D_1+\varepsilon_2$$

$$lnE2_2=\theta_1 T+\theta_2 J_2+\theta_3 W_2+\theta_4 Q_2+\theta_5 \mathrm{AADT2}_2+\theta_6 A_2+\theta_7 D_2+\varepsilon_2$$

$$lnE2_3=\theta_1 T+\theta_2 J_3+\theta_3 W_3+\theta_4 Q_3+\theta_5 \mathrm{AADT2}_3+\theta_6 A_3+\theta_7 D_3+\varepsilon_2$$

obtain the road safety quantification sub-model $\ln E2_n$ corresponding to each traffic road, where E2 is an accident occurrence amount of the traffic road in a preset time period; $\varepsilon_n$ is an error term of the road safety quantification sub-model; n ranges from 1 to N; N is a total quantity of traffic roads included in each sub-region; $AADT2_n$, $J_n$, $W_n$, $Q_n$, $T_n$, $A_n$, $D_n$ respectively represent motor vehicle annual average daily traffic, a traffic road lane quantity, a traffic road width, whether the traffic road is provided with an accommodation lane, the categorical variable corresponding to the safety risk exposure of the traffic road, intersection density of the traffic road, and a traffic road grade of an $n^{th}$ traffic road included in the sub-region; $\theta_1$, $\theta_2$, $\theta_3$, $\theta_4$, $\theta_6$, $\theta_7$ respectively correspond to the categorical variable corresponding to the safety risk exposure of the sub-region, and the traffic road lane quantity, the traffic road width, whether the traffic road is provided with an accommodation lane, the intersection density of the traffic road, and a safety influence coefficient of the traffic road grade of the $n^{th}$ traffic road included in the sub-region; $\beta_5^{T=1}$ represents a safety influence coefficient in a case of the categorical variable T=1 corresponding to the safety risk exposure of the $n^{th}$ traffic road included in the sub-region; and $\theta_5^{T=0}$ represents a safety influence coefficient in a case of the categorical variable T=0 corresponding to the safety risk exposure of the $n^{th}$ traffic road included in the sub-region; and when the traffic road is provided with an accommodation lane, $Q_n$=1; when the traffic road is not provided with an accommodation lane, $Q_n$=0; when the road grade is a main road, $D_n$=1; when the road grade is a secondary road, $D_n$=2; and when the road grade is a branch road, $D_n$=3, where $\theta_5^{T=0}+\theta_5^{T=0}*\ln AADT_i'=\theta_5^{T=1}+\theta_5^{T=1}*\ln AADT_i'$, and in this case, $AADT_i'$ is the median value of motor vehicle annual average daily traffic of all the traffic roads in the sub-region; and construct, based on the road safety quantification sub-models respectively corresponding to the traffic roads in the sub-region b1 and the historical traffic data of the sub-region, a region safety quantification sub-model corresponding to the sub-region as follows:

$$lnE1_m=\beta_1 N_m+\beta_2 GDP_m+\beta_3 K_m+\beta_4^{T=0} T_m+\beta_4^{T=1} T_m+\beta_4^{T=0}\,\mathrm{AADT1}_m+\beta_4^{T=1}\mathrm{AADT1}_m+\beta_5 L1_m+\beta_6 L2_m+\beta_7 L3_m+\beta_8 L4_m+\beta_9 V_m+\varepsilon_m$$

obtain a region safety quantification sub-model $\ln E1_m$ corresponding to each sub-region in the limited region range, where E1 is an accident occurrence amount of the sub-region in a preset time period; $\varepsilon_m$ is an error term of the region safety quantification sub-model; m ranges from 1 to M; M is a total quantity of sub-regions included in the limited region range; $N_m$, $GDP_m$, $K_m$, $T_m$, $AADT1_m$, $V_m$, $L1_m$, $L2_m$, $L3_m$, $L4_m$ respectively represent population density, GDP, road network density, the categorical variable corresponding to the safety risk exposure of the sub-region, motor vehicle annual average daily traffic, an average driving speed, a green area ratio, a residential area ratio, a non-residential area ratio, and a road area ratio of an $m^{th}$ sub-region in the limited region range; $\beta_1$, $\beta_2$, $\beta_3$, $\beta_5$, $\beta_6$, $\beta_7$, $\beta_8$, $\beta_9$ respectively represent safety influence coefficients of the population density, the GDP, the road network density, the green area ratio, the residential area ratio, the non-residential area ratio, the road area ratio, and the average driving speed of the $m^{th}$ sub-region in the limited region range; $\beta_4^{T=0}$ represents a safety influence coefficient in a case of the categorical variable T=0 corresponding to the safety risk exposure of the $m^{th}$ sub-region in the limited region range; and $\beta_4^{T=1}$ represents a safety influence coefficient in a case of the categorical variable T=1 corresponding to the safety risk exposure of the $m^{th}$ sub-region in the limited region range, where $\beta_4^{T=0}+\beta_4^{T=0}*\ln AADT_i'=\beta_4^{T=1}+\beta_4^{T=1}*\ln AADT_i'$, and in this case, $AADT_i'$ is the median value of motor vehicle annual average daily traffic of all the sub-regions in the limited region range; and the region safety quantification sub-model corresponding to the traffic community b1 is as follows:

$$lnE1_1=\beta_1 N_1+\beta_2 GDP_1+\beta_3 K_1+\beta_4 \mathrm{AADT1}_1+\beta_5 L1_1+\beta_6 L2_1+\beta_7 L3_1+\beta_8 L4_1+\beta_9 V_1+\varepsilon_1$$

where $\ln E1_1=\ln E2_1+\ln E2_2+\ln E2_3$; and enter step D.

Step D: Use, for each sub-region, a model group formed by a region safety quantification sub-model corresponding to the sub-region and road safety quantification sub-models respectively corresponding to traffic roads in the sub-region as a safety evaluation model corresponding to the sub-region, where an input by each sub-model in the model group is historical traffic data corresponding to the sub-model.

Step E: Obtain, according to the method in step A to step C, a region safety quantification sub-model corresponding to the sub-region and each road safety quantification sub-model based on actual traffic data of the sub-region and actual traffic data of each traffic road in the sub-region, and enter step F.

Step F: Solve, for the sub-region by using the safety evaluation model according to the method in step D, the region safety quantification sub-model corresponding to the sub-region and the road safety quantification sub-models by using a constraint function as a target, to obtain influencing factors of road safety of the sub-region, and perform safety evaluation on the sub-region and each traffic road in the sub-region according to the influencing factors.

Under a constraint condition, influence mechanisms of various influencing factors on road safety in different dimensions can be determined respectively. If a coefficient of an influencing factor is positively significant at a 95% confidence interval, it indicates that the influencing factor increases the incidence of accidents in traffic communities or roads; and if the coefficient of the influencing factor is negatively significant at the 95% confidence interval, it indicates that the influencing factor reduces the incidence of accidents in traffic communities or roads.

The experimental verification of the present invention is carried out under hypothetical data conditions. Taking an element N of the traffic community as an example, if $\beta_1>0$ at the 95% confidence interval, it indicates that the population density of the traffic community is positively correlated with the incidence of road accidents, and greater population density indicates more accidents in the traffic community. If $\beta_1<0$ at the 95% confidence interval, it indicates that the population density of the traffic community is negatively correlated with the incidence of road accidents, and greater population density indicates less accidents in the traffic community.

Although the present invention is described with reference to the foregoing preferred embodiments, the embodiments are not intended to limit the present invention. A person of ordinary skill in the art may make variations and modifications without departing from the spirit and scope of the present invention. Therefore, the protection scope of the present invention should be subject to the claims.

What is claimed is:

1. A method for evaluating road safety based on multi-dimensional influencing factors, comprising: respectively constructing, for each sub-region in a limited region range, a safety evaluation model through step A to step D, and obtaining, by using the safety evaluation model through step E to step F, influencing factors of safety of each traffic road in the sub-region and performing safety evaluation on the sub-region, the sub-region having a plurality of sub-region characteristics, each traffic road in the sub-region having a plurality of traffic road characteristics:

step A: periodically obtaining, for the sub-region, historical traffic data of the sub-region within a preset duration and historical traffic data of each traffic road in the sub-region within the preset duration, and entering step B;

step B: using motor vehicle daily traffic as safety risk exposure, obtaining safety risk exposure corresponding to the sub-region and safety risk exposure corresponding to each traffic road of the sub-region based on the historical traffic data of the sub-region within the preset duration and the historical traffic data of each traffic road in the sub-region within the preset duration, quantifying the safety risk exposure corresponding to the sub-region and the safety risk exposure corresponding to each traffic road of the sub-region to obtain a categorical variable T corresponding to each of the safety risk exposure corresponding to the sub-region and the safety risk exposure corresponding to each traffic road of the sub-region, and entering step C;

step C: constructing, for each traffic road comprised in the sub-region, a road safety quantification sub-model based on the corresponding historical traffic data and the corresponding categorical variable T obtained in step B, to obtain road safety quantification sub-models respectively corresponding to the traffic roads in the sub-region; and constructing, based on the road safety quantification sub-models respectively corresponding to the traffic roads in the sub-region and the historical traffic data of the sub-region, a region safety quantification sub-model corresponding to the sub-region, and entering step D;

step D: using, for each sub-region, a model group formed by the region safety quantification sub-model corresponding to the sub-region and the road safety quantification sub-models respectively corresponding to the traffic roads in the sub-region as a safety evaluation model corresponding to the sub-region, wherein an input by each of the region safety quantification sub-models in the model group is the historical traffic data corresponding to the road safety quantification sub-model;

step E: obtaining, according to step A to step C, a region safety quantification sub-model corresponding to the sub-region and each road safety quantification sub-model based on actual traffic data of the sub-region and actual traffic data of each traffic road in the sub-region, and entering step F; and step F: solving, for the sub-region by using the safety evaluation model according to step D, the region safety quantification sub-model corresponding to the sub-region and the road safety quantification sub-models corresponding to the traffic roads in the sub-region by using a constraint function as a target, obtaining influencing factors for the plurality of sub-region characteristics of the sub-region and the plurality of traffic road characteristics of each traffic road in the sub-region based on the solved region safety quantification sub-model corresponding to the sub-region and road safety quantification sub-models corresponding to the traffic roads in the sub-region, and performing safety evaluation on the sub-region and each traffic road in the sub-region according to the influencing factors.

2. The method for evaluating road safety based on multi-dimensional influencing factors according to claim 1, comprising: periodically obtaining historical traffic data of each sub-region in the limited region range within the preset duration, wherein the historical traffic data corresponding to each sub-region comprises: population density N of the sub-region, GDP of the sub-region, road network density K of the sub-region, motor vehicle annual average daily traffic AADT1 of the sub-region, a green area ratio L1 of the sub-region, a residential area ratio L2 of the sub-region, a non-residential area ratio L3 of the sub-region, a road area ratio L4 of the sub-region, and an average driving speed V of the sub-region; and historical traffic data corresponding to each traffic road in each sub-region comprises: a traffic road length D, a traffic road lane quantity J, a traffic road width W, whether the traffic road is provided with an accommodation lane Q, motor vehicle annual average daily traffic AADT2 of the traffic road, A, intersection density A of the traffic road, and a traffic road grade D.

3. The method for evaluating road safety based on multi-dimensional influencing factors according to claim 2, wherein step B further comprises: based on the historical traffic data of the sub-region within the preset duration and the historical traffic data of each traffic road in the sub-region within the preset duration, obtaining, for each traffic road corresponding to the sub-region according to the following formula:

$$T = \begin{cases} 1, & AADT_i > AADT_i' \\ 0, & AADT_i < AADT_i' \end{cases}$$

the categorical variables T respectively corresponding to the safety risk exposure of the sub-region and the traffic roads, wherein $AADT_i$ is AADT1 or AADT2; when $AADT_i$=AADT1, $AADT_i'$ is a median value of motor vehicle annual average daily traffic of all the sub-regions in the limited region range; and when $AADT_i$=AADT2, $AADT_i'$ is a median value of motor vehicle annual average daily traffic of all the traffic roads in the sub-region.

4. The method for evaluating road safety based on multi-dimensional influencing factors according to claim 3, wherein step C further comprises: obtaining, for each traffic road comprised in the sub-region according to the following formula:

$$lnE2n=\theta_1 T+\theta_2 J_n+\theta_3 W_n+\theta_4 Q_n+\theta_5^{T=0}T_n+\theta_5^{T=1}T_n+\theta_5^{T=0}AADT2_n+\theta_5^{T=1}AADT2_n+\theta_6 A_n+\theta_7 D_n+\varepsilon_n$$

the road safety quantification sub-model $lnE2_n$ corresponding to each traffic road, wherein E2 is an accident occurrence amount of the traffic road in a preset time period; $\varepsilon_n$ is an error term of the road safety quantification sub-model; n ranges from 1 to N; N is a total quantity of traffic roads comprised in each sub-region; $AADT2_n$, $J_n$, $W_n$, $Q_n$, $T_n$, $A_n$, $D_n$ respectively represent motor vehicle annual average daily traffic, a traffic road lane quantity, a traffic road width, whether the traffic road is provided with an accommodation lane, the categorical variable corresponding to the safety risk exposure of the traffic road, intersection density of the traffic road, and a traffic road grade of an $n^{th}$ traffic road comprised in the sub-region; $\theta_1$, $\theta_2$, $\theta_3$, $\theta_4$, $\theta_6$, $\theta_7$ respectively correspond to the categorical variable corresponding to the safety risk exposure of the sub-region, and the traffic road lane quantity, the traffic road width, whether the traffic road is provided with an accommodation lane, the intersection density of the traffic road, and a safety influence coefficient of the traffic road grade of the $n^{th}$ traffic road comprised in the sub-region; $\theta_5^{T=1}$ represents a safety influence coefficient in a case of the categorical variable T=1 corresponding to the safety risk exposure of the $n^{th}$ traffic road comprised in the sub-region; and $\theta_5^{T=0}$ represents a safety influence coefficient in a case of the categorical variable T=0 corresponding to the safety risk exposure of the $n^{th}$ traffic road comprised in the sub-region; and when the traffic road is provided with an accommodation lane, $Q_n$=1; when the traffic road is not provided with an accommodation lane, $Q_n$=0; when the road grade is a main road, $D_n$=1; when the road grade is a secondary road, $D_n$=2; and when the road grade is a branch road, $D_n$=3, wherein $\theta_5^{T=0}+\theta_5^{T=0}*\ln AADT_i'=\theta_5^{T=1}+\theta_5^{T=1}*\ln AADT_i'$, and in this case, $AADT_i'$ is the median value of motor vehicle annual average daily traffic of all the traffic roads in the sub-region; and obtaining, for each sub-region in the limited region range according to the following formula:

$$lnE1_m=\beta_1 N_m+\beta_2 GDP_m+\beta_3 K_m+\beta_4^{T=0}T_m+\beta_4^{T=1}T_m+\beta_4^{T=0}AADT1_m+\beta_4^{T=1}AADT1_m+\beta_5 L1_m+\beta_6 L2_m+\beta_7 L3_m+\beta_8 L4L_m+\beta_9 V_m+\varepsilon_m$$

a region safety quantification sub-model $lnE1_m$ corresponding to each sub-region in the limited region range, wherein E1 is an accident occurrence amount of the sub-region in a preset time period; $\varepsilon_m$ is an error term of the region safety quantification sub-model; m ranges from 1 to M; M is a total quantity of sub-regions comprised in the limited region range; $N_m$, $GDP_m$, $K_m$, $T_m$, $AADT1_m$, $V_m$, $L1_m$, $L2_m$, $L3_m$, $L4_m$ respectively represent population density, GDP, road network density, the categorical variable corresponding to the safety risk exposure of the sub-region, motor vehicle annual average daily traffic, an average driving speed, a green area ratio, a residential area ratio, a non-residential area ratio, and a road area ratio of an $m^{th}$ sub-region in the limited region range; $\beta_1$, $\beta_2$, $\beta_3$, $\beta_5$, $\beta_6$, $\beta_7$, $\beta_8$, $\beta_9$ respectively represent safety influence coefficients of the population density, the GDP, the road network density, the green area ratio, the residential area ratio, the non-residential area ratio, the road area ratio, and the average driving speed of the $m^{th}$ sub-region in the limited region range; $\beta_4^{T=0}$ represents a safety influence coefficient in a case of the categorical variable T=0 corresponding to the safety risk exposure of the $m^{th}$ sub-region in the limited region range; and $\beta_4^{T=1}$ represents a safety influence coefficient in a case of the categorical variable T=1 corresponding to the safety risk exposure of the $m^{th}$ sub-region in the limited region range, wherein $\beta_4^{T=0}+\beta_4^{T=0}*\ln AADT_i'=\beta_4^{T=1}+\beta_4^{T=1}*\ln AADT_i'$, and in this case, $AADT_i'$ is the median value of motor vehicle annual average daily traffic of all the sub-regions in the limited region range.

5. The method for evaluating road safety based on multi-dimensional influencing factors according to claim 4, wherein the constraint function in step F is as follows:

$$\ln E1_m = \sum_{n=1}^{N} \ln E2_n;$$

and the method further includes:

training the safety evaluation model by using the constraint function as the target, and solving, under a constraint condition, safety influence coefficients in the region safety quantification sub-model corresponding to the sub-region and the road safety quantification sub-models, to obtain significance of the safety influence coefficients at a 95% confidence interval, wherein when the safety influence coefficient is positively significant at the 95% confidence interval, traffic data corresponding to the safety influence coefficients increases incidence of traffic accidents on the traffic road; and when the safety influence coefficient is negatively significant at the 95% confidence interval, the traffic data corresponding to the safety influence coefficient reduces the incidence of traffic accidents on the traffic road.

6. A system for evaluating road safety based on multi-dimensional influencing factors, comprising:

one or more processors; and a memory, storing executable instructions, wherein when the instructions are executed by the one or more processors, the one or more processors perform a process comprising the method for evaluating road safety according to claim 1.

7. A non-transitory computer-readable storage medium storing software, wherein the software comprises instructions that can be executed by one or more computers, and the instructions, when executed by the one or more computers, perform the operations of the method for evaluating road safety according to claim 1.

* * * * *